Oct. 21, 1930.  L. CONSTANTIN  1,778,793
ELECTRIC GENERATING PLANT OPERATED BY WINDMILL POWER
Filed Feb. 5, 1925
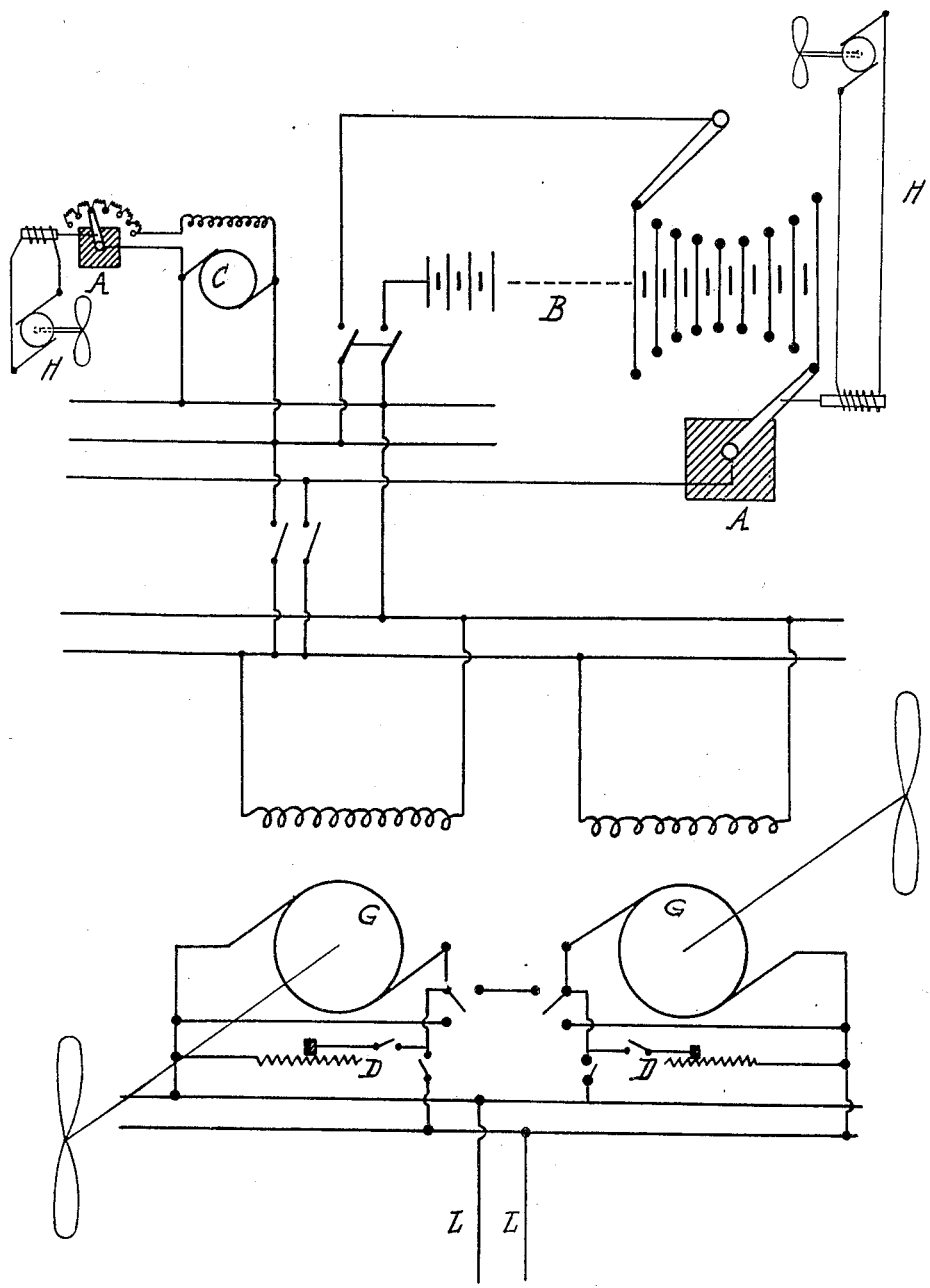

Patented Oct. 21, 1930

1,778,793

UNITED STATES PATENT OFFICE

LOUIS CONSTANTIN, OF PARIS, FRANCE, ASSIGNOR OF ONE-HALF TO PAUL FORTIER-BEAULIEU, OF ROANNE, FRANCE

ELECTRIC GENERATING PLANT OPERATED BY WINDMILL POWER

Application filed February 5, 1925. Serial No. 7,127.

The present invention relates to the arrangement of a plant comprising an electric station employing windmills as a source of power, in combination with a suitable power line, the entire plant being such that the power furnished by the wind will be utilized in the optimum conditions.

As a rule, electric power stations may be divided into two classes (a) stations operating upon a constant voltage and variable current, and (b) stations operating upon constant current and variable voltage. The first-mentioned class is in more general use, and comprises the major part of the stations in operation, inclusive of windmill electric plants.

But windmill power is of an essentially variable nature, it depending upon the velocity of the wind; so that to utilize it to the maximum it becomes necessary to employ an electric generating plant in combination with a power line which is adapted to great variations. For this reason, it has been found advisable to employ a third type of generating station wherein the voltage and current are both variable.

Let us consider a generating station, for instance of the continuous current type, in which is comprised the equivalent resistance of all the units in the work circuit such as motors, electrolytic apparatus, electric boiler and the like which are supplied by this station, said resistance being represented by the value R, which is in the present instance assumed to be constant to obtain the corresponding values of I and E.

If at any given moment the wind has the velocity V, and the supply tension of the plant on the bus bars is E, the power W available in the station will be:

$$W = KV^3 = \frac{E^2}{R} = RI^2$$

in which K is a constant and I is the main current.

Should V vary and become $nV$, the available power will be:

$$n^3 W = Kn^3 V^3 = \frac{(En^{\frac{3}{2}})^2}{R} = R(In^{\frac{3}{2}})^2$$

For this reason, the voltage should be raised to the value $En^{\frac{3}{2}}$ and the original current raised to the value $In^{\frac{3}{2}}$ failing in which the full power will not be utilized.

If by reason of the power variations the customers on the work circuit are led to vary the value of R in order to properly operate their apparatus the formula for the voltage and current variations will now change, but I prefer in all cases to vary these two factors at the same time.

But the voltage value at the output end of the generating station, which voltage serves to determine the available power in the work circuit, will itself depend solely upon the excitation of the said generator inasmuch as the speed thereof producing the maximum power will depend upon the velocity of the wind. It will be obviously feasible to provide each generator, should a plurality of said generators be connected in parallel, with an automatic regulator controlled by the wind and effecting the optimum excitation, but for simplicity of operation I prefer to utilize generators of a like construction and to connect together all the exciting circuits thereof whether series or parallel; the exciting circuit will thus comprise but a single automatic regulator. The said circuit will be supplied by a special electric generator or by a storage battery.

It should be noted that undue frequency variations are not allowable in modern installations, save for a few exceptional cases for instance wherein the work circuit solely comprises electric boilers. For this reason, I prefer to employ continuous current when the power is produced for instance by windmills operating at variable speed. If a power line of some length is to be employed, the said generators should have the series coupling in order to afford a high tension.

The appended drawings show in a single figure a power plant which is arranged according to the invention.

The output lines L L are supplied by separately excited continuous current generators G G connected in series, whereof a sufficient number are provided; said machines are so designed as to operate between wide limits of voltage and current. They are excited by a separate generator C or a storage battery B whose voltage is regulated by an automatic regulator A, actuated by an automatic regulator controlled by the wind, such as the electro-dynamic anemometer control H, in such manner that the voltage will increase and decrease respectively with an increase and decrease in the velocity of the wind. The fields of the generators may be connected in series or in parallel.

It is evident that in such conditions, R being constant, the voltage and current of the said generators will vary in accordance with the variations in wind velocity, and that a plant thus disposed will operate at highest efficiency only when, the customers on the power line put into service more or less apparatus, in such manner as to utilize at all times the exact amount of available power.

The said arrangement differs essentially from what is in use in the present central stations, in which the power is supplied according to the customers' needs.

What I claim is:

1. In an electric power plant comprising a generator actuated by a windmill, the combination with said generator of an exciting circuit therefor, a source of electricity for said exciting circuit and means controlled solely by the wind for varying the current in the said exciting circuit.

2. In an electric power plant comprising a generator actuated by a windmill, the combination with said generator of an exciting circuit therefor, a source of electricity for said exciting circuit and means controlled by the wind and wholly independent of the speed of the generator for varying the current in said exciting circuit.

3. In an electric power plant comprising a generator actuated by a windmill, the combination with said generator of an exciting circuit therefor, a source of electricity for said exciting circuit and means controlled by the wind and uninfluenced by the generator for varying the current in said exciting circuit.

In testimony whereof I have signed this specification.

LOUIS CONSTANTIN.